Jan. 3, 1950     L. GRANAT     2,493,285
INTERLOCKING RING ENSEMBLE
Filed Sept. 25, 1948
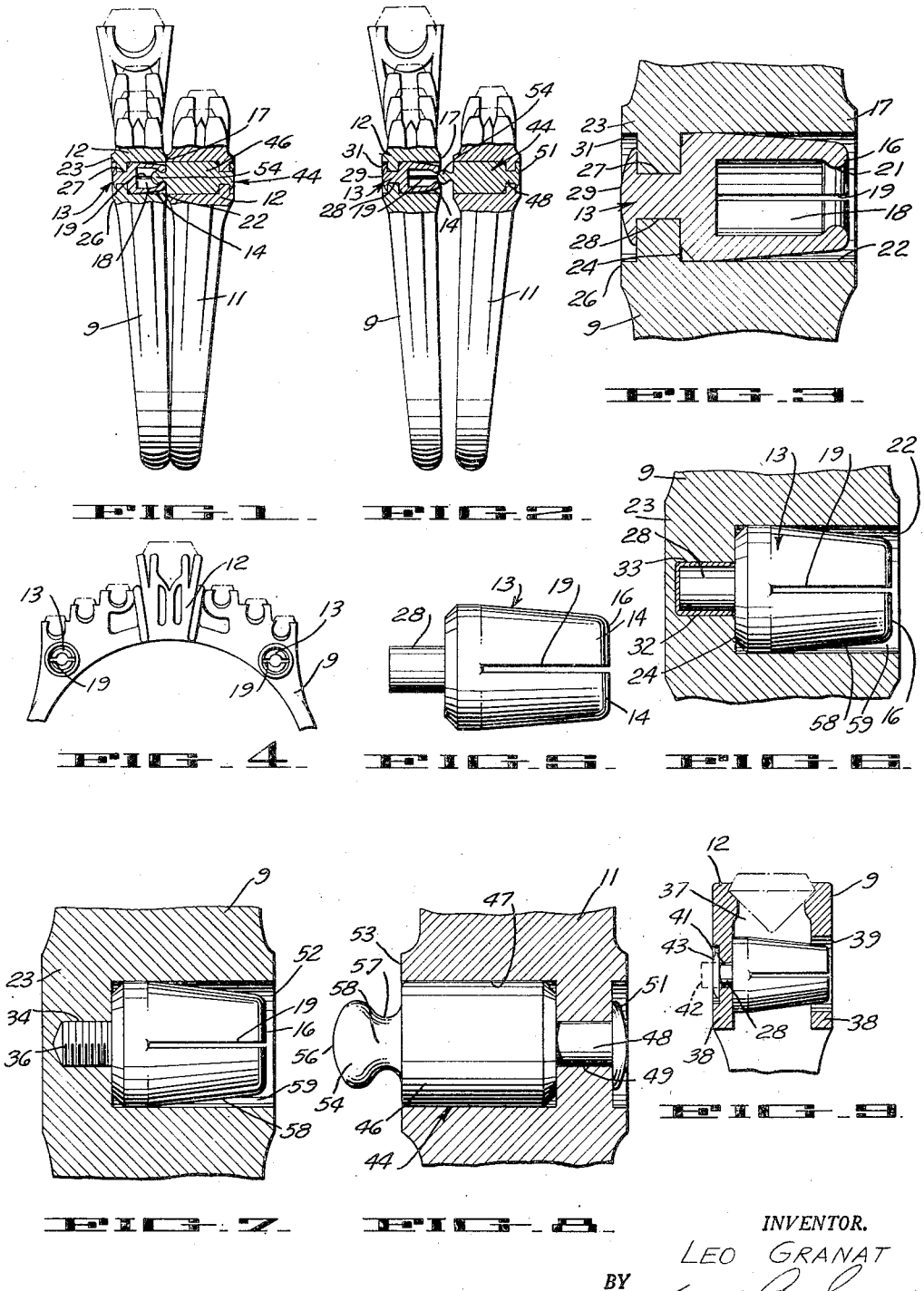
INVENTOR.
LEO GRANAT Patented Jan. 3, 1950

2,493,285

UNITED STATES PATENT OFFICE 2,493,285

INTERLOCKING RING ENSEMBLE

Leo Granat, San Francisco, Calif.

Application September 25, 1948, Serial No. 51,260

5 Claims. (Cl. 63—16)

This invention relates to fastening elements providing for the rapid joining and subsequent relative detachment of a pair of members and has particular reference to a device of the above character which may be incorporated in each of a pair of finger rings or the like so as to insure against undesirable relative positional displacement between the rings when the latter are being worn upon the finger.

An object of the invention is to provide interengageable fastening elements for finger ring ensembles which, although of very small size so as to render them as inconspicuous as possible, are nevertheless designed and constructed to provide for secure connection of one ring with the other and to preserve such security over repeated attachments and separations of the rings.

Another object of the invention is to provide fastening elements of the nature referred to which, when worn beyond a useful condition, may be readily replaced by new elements without the need of undertaking extensive mechanical operations on the rings to effect the replacement.

A further object of the invention is to provide in finger rings composed of comparatively soft precious metal, improved fastening means for effecting interlocked engagement of a pair of the rings, the said fastening means being constructed of material having wear resistance superior to that of the rings.

Still another object of the invention is to provide fastening elements of the class described which may be easily reconditioned, after having worn substantially to the point of insecurity, so as to restore in a large measure the original gripping power of the elements.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to the drawing:

Figure 1 is a side elevational view of a pair of finger rings showing them interlocked by means of the improved fastening elements of my invention. A portion of the view is broken away and shown in vertical section so as to more clearly disclose the internal construction.

Figure 2 is a view similar to Figure 1 showing the rings in partially detached positions.

Figure 3 is an enlarged vertical sectional view of the socket member forming one of the fastening elements.

Figure 4 is a side elevational view of a portion of the ring carrying the socket elements of the fasteners.

Figure 5 is an enlarged side elevational view of the socket fastener element.

Figure 6 is an enlarged vertical sectional view of a portion of a ring illustrating one method of securing the socket element to the ring setting.

Figure 7 is a view similar to Figure 6 showing a modified type of mounting for the socket element.

Figure 8 is an enlarged vertical sectional view similar to Figures 6 and 7 showing the preferred means for mounting the stud element of the fastener to the ring setting.

Figure 9 is an enlarged vertical sectional view showing a method of attaching the fastener of my invention to a ring having a hollow shell-type setting.

Various types of fasteners have previously been proposed for detachably securing together finger ring ensembles, the most common of which consist of engagement and wedding rings, for the purpose of preventing undesirable rotational displacement between the rings while the latter are being worn upon the finger and to maintain the gem setting portions of the rings in proper relative alignment. The two prime requisites of such fasteners are that they be sufficiently small so as to be as inconspicuous as possible and yet be possessed of sufficient strength and ruggedness to resist the abrasion of repeated connections and disconnections of the fastener elements and to correspondingly preserve the gripping power of the elements. In a large proportion of the fasteners heretofore proposed, the interengageable elements were formed either as homogeneous portions of the rings or were constructed as separate members capable of being pivotally or slidably moved from operative extended positions to concealed positions within the bodies of one or both rings, the form and positioning of the fasteners being arranged to blend pleasingly into the surface decoration of the rings. In each case, the precious metal comprising the component parts of the fastener is rather ductile and after numerous attachments and detachments of the rings becomes so abraded or deformed that the original secure engagement of the fastener is destroyed thereafter permitting the rings to become separated under slight force such as that produced by muscular expansion incident to normal flexing of the finger upon which the rings are being worn. In the case of the pivoted types of fastener elements, the pivot pins are of such minute size that destructive shearing thereof may easily occur.

It is in the repairing of worn or broken fastener elements that highly skilled and consequently expensive operations are necessary. In the case where the elements are formed as homogeneous parts of the ring bodies, reconditioning may mean the addition to the elements of extraneous material replacing that which may have been lost due to the abrasive action of repeatedly joining or disconnecting the elements. In some cases where the fastener material is merely displaced, it may be possible to re-shape the elements to substantially their original form but in the majority of instances such re-shaping entails the more difficult procedure of adding material and reforming the elements or causing ambient ring material to flow by forging operations into and increase to the depleted bulk of the elements. Such operations, it is obvious, must be carried out with extreme care in order to prevent damage to or noticeable deformation of the ring body.

I have provided an improved type of fastening means for ring ensembles or the like designed to provide for long and trouble-free useful life and to permit ready reconditioning of the fastener elements should the latter become worn to the extent wherein security of engagement therebetween is no longer obtainable. As shown in Figure 1, and intended solely for purposes of illustration, I have chosen to embody the improved fastener of my invention in a pair of finger rings, generally known in the jewelry art as an ensemble, it being of course obvious that use of the fastener is not limited to such rings since the latter are merely indicative of a wide variety of separate members which may advantageously be arranged for relative engagement and separation. The illustrated ensemble comprises an engagement ring 9 and a wedding ring 11 shown in the relative coaxial positions they properly occupy when being worn upon the finger, the gem settings 12 comprising the usually enlarged band portions of the rings being disposed in substantially contiguous and parallel relationship. In one of the rings, here shown as the engagement ring 9 and preferably positioned in the base member or gem setting 12 thereof, I provide an insert, generally indicated by the numeral 13, which may comprise a conveniently cylindrical body 14 suitably secured in the setting, having an end face 16 substantially aligned with a side face 17 of the setting and provided, preferably, with an axially extending recess 18 which opens at the end face 16. One or more axially-extending slits 19 provided in the insert or plug and preferably coextensive with the recess 18, permit a degree of radial expansion and contraction of the insert or plug. The mouth of the recess 18, preferably closely adjacent the intersection of the latter with the face 16, is radially constricted in any suitable manner preferably by providing a peripheral bead 21 which may be conveniently formed as an integral part of the plug or insert and which extends inwardly of the recess from the peripheral side wall surface thereof. The bead 21, in transverse cross-sectional form, is preferably semi-circular or of polygonal shape substantially equivalent to the first-mentioned form.

Securing of the insert 13 in the ring body or gem setting 12 may be accomplished in one of a number of different ways, several of which are illustrated in Figures 1, 6 and 7. In each of the aforementioned views, the portion of the ring in which the insert is mounted is assumed to be composed of solid metals in which case a cavity 22 is bored or otherwise formed in the setting of longitudinal and lateral size sufficient to snugly enclose the insert and to provide a wall 23 disposed between the inner end 24 of the insert and the outer side surface 26 of the ring setting opposite the side surface 14 thereof. In Figure 1 this wall 23 is provided with an aperture 27 aligned with the cavity 22 and through which may extend a stud 28 best shown in Figure 5, which is preferably constructed as an integral part of the insert. The stud 28 is sufficiently elongated so that its outer end, when the insert is properly positioned within the cavity, will extend beyond the surface 26 to permit the stud extension to be peened over to form a head 29 and thus effect secure riveted attachment of the insert to the setting. The riveted head 29 may be suitably formed or engraved to conform with and blend into the surface decoration of the ring setting. A further feature of construction may be the provision, at the outer exposed end of the aperture 27, of a concentric counterbore 31 in which the head 29 may be formed to a finished condition substantially flush with or below the setting surface 26.

In Figure 6 the cavity 22 is shown provided with a smaller axially continuing recess 32 which preferably does not extend through the wall 23 and in which may be secured, by a solder binder 33, the somewhat axially shortened stud 28 of the insert. I may choose, however, as a modified form of construction, to dispense with the recess 33 and its cooperative stud and to solder the solid end portion of the insert into the bottom of the cavity 22 in much the same manner as the stud is secured in the recess.

In Figure 7 I have shown the method of mounting the insert wherein a recess 34, similar to the recess 33, is provided with internal screw threads with which is engaged the correspondingly threaded stud 36 of the insert. In such construction, the one or more slits 19 formed in the insert may conveniently serve to receive a blade-type instrument by means of which the insert may be manually rotated during insertion or removal thereof from the ring setting.

Figure 9 illustrates a a construction found in a large number of rings wherein the setting 12 is made hollow by the provision of an internal recess 37 therein as a result of which the setting includes opposed comparatively thin side walls 38. The fastener of my invention lends itself well to installation in this otherwise difficult situation. Here one of the side walls is shown as being provided with an opening 39 just large enough to permit passage of the insert therethrough, the opposite side wall having therein an aligned smaller aperture 41 through which the axially shortened stud 28 of the insert may be passed, the portion of the latter which extends beyond the outer surface of the side wall and which is indicated by the dotted lines 42 being then peened over radially to form the rivet head 43 shaped or decorated as above described so as to blend harmoniously into the surface decoration of the ring.

The other member of the ensemble, here shown as the wedding ring 11, is provided with a complementary fastener element, generally indicated by the numeral 44, adapted to be brought into intimate pressure-retained engagement with the fastener element 13 and which is so positioned on the ring 11 that the joined rings will be disposed in exact relative axial alignment. The fastener element 44 may be formed, if desired, of an homogeneous portion of the material forming the mass of the ring 11 but I prefer that the element be constructed as a separate body secured to the ring in any suitable manner including those set forth above in connection with the description of the fastener element 13. As here shown in Figure 8 I have provided a rod-shaped insert 46 disposed within the body of the ring 11, preferably in a recess 47 bored or otherwise formed in said body and provided with a stud 48 here shown as extending through an aperture 49 aligned with the recess 47, the outer end of the stud being then peened over to form a rivet head 51 providing a selected type of securing means for fixing the insert to the ring body. It will be understood that the type of securing means employed with the insert 46 may be any of those illustrated in connection with the previously-described insert 13. Extending from the exposed end surface 52 of the insert 13, which is preferably arranged in flush relationship with the adjacent side surface 53 of the ring 11, is a preferably integral head 54 conveniently of cylindrical form and of a diameter which is slightly in excess of the mouth diameter measured between diametrically opposed and relatively confronting points on the innermost peripheral portion of the bead 21. The outer end surface 56 of the head 54 is substantially hemispherical in form so as to facilitate entry of the head into the mouth opening of the recess 18. When the fastener elements 13 and 44 are brought into relative axial alignment, with the head 54 of one element disposed in the recess mouth of the other element, and pressure is applied forcing the elements together in an axial direction, the hemispherical entering portion 56 of the head will press the bead 21 radially outwardly against the flexion resistance of the side wall surrounding the recess 18 thereby permitting the head to pass through the mouth and into the recess. The head 54 is provided, intermediate its outer end and the end surface 52 of the insert, with a groove 57 peripherally surrounding a diametrically reduced neck portion 58 into which the bead 21 may snap under flexion recoil of the aforesaid side wall when the head has fully passed into the recess 18 thus securely binding the fastener elements together and bringing the confronting side surfaces of the ring settings into intimate contiguous relationship. Preferably, the relationship of the head 54 to the end surface 52 of the insert, or to the side surface 53 of the ring in case the surface 52 is recessed slightly below the surface 53, is such that when the head is within the recess 18 the outwardly flexed side wall of the latter will not be fully contracted radially inwardly thus permitting the residual stress in the wall to tightly draw the rings together.

After an extended period of time during which the rings may have been repeatedly connected and disconnected, it is to be expected that the fasteners may become so worn due to abrasion or to rheological displacement of the construction material thereof that security of engagement between the fastener elements may be substantially destroyed. In the usual types of fasteners, reconditioning of the elements to substantially restore their original gripping power entails considerable skilled and tedious operations whereas in the improved fastener of my invention such reconditioning may be accomplished very readily and by a person not possessed of more than ordinary skill. It will be noted that the outer peripheral portion 58 of the insert 13 extending rearwardly from the end surface 16 is tapered divergently so as to form with the confronting surface 22 of the insert-receiving bore, or with the periphery of the opening 39 as the case may be, an axially tapering space 59, provided primarily for permitting radial expansion of the insert during movements of the fastener head into and out of the insert mouth. It will be further seen that the arrangement of the parts provides a tapering space into which may be inserted or driven a suitable tool designed to compress radially inwardly the wall portion of the insert peripherally bounding the head-receiving recess 19. The use of sufficient force in this operation to flex the wall material beyond its elastic limit, will cause the mouth of the recess 18 to become radially contracted so as to compensate somewhat for the amount of wear or material displacement which may have occurred at said mouth. In addition to this, the head 54 may be hammered on its outer end and in an axial direction so as to cause the mass of the head to expand diametrically to a sufficient degree of enlargement that substantially the original gripping relationship with the mouth bead 21 will be reestablished. Thus reconditioned, the fastener may be expected to function as efficiently and for as long a period as that which elapsed previous to the time when the need for repair became apparent. In the event that the fasteners have worn to the point wherein they are no longer capable of being repaired, they may be very readily removed bodily from the rings and replaced with new elements with a minimum of time, effort and expense.

Although a single fastener of my invention, which comprises the described pair of interengageable elements, will suffice to securely detachably connect the average members arranged for such operation, including finger ring ensembles, it is preferred to equip the latter, as shown in Figure 4, with at least a pair of complete fastener units which may be disposed, as illustrated, at peripherally separated points on the ring band and preferably adjacent opposite ends of the ring settings 12. In this way the transaxial movement between the rings, which is not completely prevented in rings equipped with single fastener units when worn on the finger, is entirely obviated. The elimination of such movement prevents undue wear on the fastener elements and greatly extends their useful life.

Of prime importance is the fact that the unusual design of the fastener of my invention permits the use of materials, in both elements thereof, which possess widely different characteristics than the materials forming the bulk of the articles to be joined. One of the main requisites of the fastener is that the engageable elements be capable of offering extended resistance to abrasion or mass displacement. Obviously the ordinary comparatively soft precious metals used in rings are not possessed of these qualities and fasteners constructed thereof would wear very rapidly and become useless. Consequently it is necessary to use, in both elements of the fastener, unusually hard and tough materials so as to resist the abrasion and other deforming forces encountered in ordinary usage. Materials such as platinum-iridium alloys, special gold or platinum compacted by pressure to render them more dense, and even non-noble metals such as Monel metal and stainless steel provide the desired abrasion and flow resistance and lend themselves well to use in the fastener of my invention. Obviously it would be impractical and entirely too expensive to construct two rings completely from the noble materials specified above just to secure, in the usual type of fastener elements, the superior wearing qualities which these materials afford. On the other hand, and due to the small masses of such superior substances needed in the fastener of my invention, the latter may be advantageously included in the rings with a minimum amount of cost and production expense.

From the foregoing description of my invention it will be seen that I have provided a greatly improved type of detachable fastener particularly adaptable to finger rings in which all of the major shortcomings of existing fasteners have been considered and overcome resulting in a device which is characterized by being very inconspicuous, at all times ready for operation without any special or complicated manipulation of the rings, which is capable of inclusion in the rings at a minimum of expense, which, when worn, permits rapid reconditioning to restore substantially the original condition of the fastener elements and which permits the use in both elements of selected and superior materials capable of affording the optimum resistance to wear in the cooperating parts.

I claim:

1. Means for releasably interconnecting a pair of rings provided with substantially corresponding gem mounting segments and arranged to be worn in axial alignment on a finger, at least one of said segments having cavities therein on one side face thereof and adjacent the opposite ends of said segment, the said segments of each ring being substantially of the same length of arc, the said side face of the segment having said cavities being in substantially a single plane, and the said other ring segment having a side face forming a single plane; said means comprising headed projections each of a prescribed diameter extending from the side face of said other ring adjacent the ends of the segment thereof and arranged in registry with and for insertion in said cavities, an insert member detachably secured in each of said cavities, each of said insert members having a recess therein of a prescribed diameter, the outer end portion of which is smaller than the diameter of said projections, said insert member also having separate portions defining said recess which are relatively yieldable to effect expansion of said recess to at least the diameter of said projection upon insertion of said projection into said recess, said member further having a body portion thereof in intimate engagement with a portion of one of said cavities so as to restrain radial expansion of said insert member, the outer end portions of said recess defining portions of said insert member engageable upon expansion with wall portions of said cavity to limit yielding of said member to a degree which will bring the diameter of said projection and recess into relative conformity, said insert members being composed of material having greater abrasion resistant quality than the material of the ring in which said members are secured.

2. In a ring ensemble including a pair of rings provided with substantially corresponding gem mounting segments and arranged to be worn in axial alignment on a finger, said segments having relatively spaced openings and headed projections of a prescribed diameter in relatively confronting faces and adjacent the opposite ends thereof, the said segments of each ring being substantially of the same length of arc, each of said faces lying in substantially a single plane, each of said projections extending from the side face of a segment and arranged in axial and circumferential registry with and for insertion in one of said openings, an insert member detachably secured in each of said openings, each of said insert members having a recess therein of a prescribed diameter at least a portion of which is smaller than the diameter of one of said projections, said insert member also having peripheral portions defining said recess provided with axially extending slots whereby said peripheral portions are relatively yieldable to effect expansion of said recess to at least the diameter of said projection upon insertion of said projection into said recess, at least a portion of said peripheral portions being smaller than the diameter of said opening, the difference in diameter between the opening and said peripheral portions of the insert member being substantially equal to the difference in diameter between the insert member recess and the headed projection whereby said expansion of said recess is limited to prevent overstressing of said peripheral portions, and said insert members being composed of a harder material than the material of the ring in which said member is secured.

3. In a ring ensemble including a pair of rings provided with substantially corresponding gem mounting segments and arranged to be worn in axial alignment on a finger, each of said segments having openings on one side face thereof and being adjacent the opposite ends of and included within said segment, the said openings of each ring being equally spaced, the edges of said openings of each ring lying in the same plane, and the said side faces of the segments of each ring being in generally the same plane with the plane of the edges of its respective openings, means for releasably interconnecting said rings, said means comprising insert members having headed projections thereon detachably secured in each of said openings on one of said rings, said headed projections being of a prescribed diameter and extending from the side face of the ring and arranged in registry with and for insertion in the openings in the other ring, insert members detachably secured in the openings of said other ring, each of said latter members having a recess therein of a prescribed diameter of said projections, said latter insert member also having separate portions defining said recess which are relatively yieldable to effect expansion of said recess to at least the diameter of said projection upon insertion of said projection into said recess, said latter named member further having an axially tapering body, the inner end portion of which is in intimate engagement with a wall portion of one of said openings so as to restrain radial expansion of said member, and the outer end portion of which is radially spaced from a portion of said opening engageable upon expansion with wall portions of the opening to limit yielding of said members to a degree which will bring diameters of said projection and recess into relative conformity, and at least one pair of said insert members being composed of a harder material than the material of the ring in which the member is secured.

4. Means for releasably interconnecting a pair